(12) United States Patent
Frankel et al.

(10) Patent No.: US 8,983,293 B2
(45) Date of Patent: Mar. 17, 2015

(54) ELECTRO-OPTICAL SWITCHING FABRIC SYSTEMS AND METHODS

(75) Inventors: Michael Y. Frankel, Baltimore, MD (US); Michael Gazier, Ottawa (CA); Joseph Berthold, Fallston, MD (US)

(73) Assignee: Ciena Corporation, Hanover, MD (US)

( * ) Notice: Subject to any disclaimer, the term of this patent is extended or adjusted under 35 U.S.C. 154(b) by 296 days.

(21) Appl. No.: 13/455,284

(22) Filed: Apr. 25, 2012

(65) Prior Publication Data

US 2013/0287397 A1    Oct. 31, 2013

(51) Int. Cl.
*G02B 6/26* (2006.01)
*H04B 10/27* (2013.01)
*H04Q 11/00* (2006.01)
*H04J 14/02* (2006.01)

(52) U.S. Cl.
CPC .............. *H04B 10/271* (2013.01); *G02B 6/26* (2013.01); *H04Q 11/0001* (2013.01); *H04J 14/0212* (2013.01); *H04J 14/0213* (2013.01); *H04Q 11/0005* (2013.01); *H04J 14/0257* (2013.01); *H04Q 2011/003* (2013.01); *H04Q 2011/0032* (2013.01)
USPC ................................................. 398/50; 385/17

(58) Field of Classification Search
None
See application file for complete search history.

(56) References Cited

U.S. PATENT DOCUMENTS

| | | | |
|---|---|---|---|
| 2003/0138253 A1* | 7/2003 | Kim et al. | 398/69 |
| 2008/0075071 A1* | 3/2008 | Beshai | 370/386 |
| 2009/0074414 A1* | 3/2009 | Miles et al. | 398/75 |

* cited by examiner

*Primary Examiner* — Mike Stahl
(74) *Attorney, Agent, or Firm* — Clements Bernard PLLC; Christopher L. Bernard; Lawrence A. Baratta, Jr.

(57) ABSTRACT

An optical switch fabric, including: a first set of horizontal optical waveguides receiving a plurality of wavelengths; a plurality of wavelength-selective drop optical switches associated with the first set of horizontal optical waveguides, wherein the plurality of wavelength-selective drop optical switches are each configured to drop a selected wavelength from a horizontal optical waveguide of the first set of horizontal optical waveguides to an associated vertical optical waveguide of a plurality of vertical optical waveguides; and a plurality of controllable optical switches associated with the plurality of vertical optical waveguides, wherein the plurality of controllable optical switches are each configured to direct a selected wavelength from a vertical optical waveguide of the plurality of vertical optical waveguides to a horizontal optical waveguide of a second set of horizontal optical waveguides, and wherein the second set of horizontal optical waveguides output a plurality of wavelengths.

20 Claims, 6 Drawing Sheets

ELECTRO-OPTICAL SWITCHING FABRIC SYSTEMS AND METHODS

FIELD OF THE DISCLOSURE

The present disclosure describes switching fabric systems and methods, and more particularly, electro-optical switching fabric systems and methods which may be used for the interconnection of switches such as server racks in a data center or the like. Further, the present disclosure describes systems and methods for the interconnection of multi-rack routers and electrical switches such as in a data center or the like. These interconnections are based on a novel optical switch fabric and associated method of operation.

BACKGROUND OF THE DISCLOSURE

A small data center may include a modest number of server racks, but a large data center may include 100,000 servers or more. There are typically 20-100 servers in a server rack, meaning that 1,000-5,000 server racks are present in such a large data center. These server racks each typically include an electrical switch interconnecting the servers in the server rack, and interconnecting the servers with other servers in the data center. These server rack-level switches are referred to as "top of rack" (TOR) switches. Depending on the number of servers in the data center, the TORs are interconnected through a single layer of electrical core switches, or may require a multi-layer electrical switching architecture. A typical configuration for large data centers is to group the server racks in rows and introduce one or two electrical "end of row" (EOR) switches to provide interconnection of the TOR switches in each row, and to interconnect the rows in the data center. A locally-interconnected group of server racks in a data center is also referred to as a "cluster," a "pod," or the like. Beyond the rows or clusters, there may also be a layer of electrical core switching, or even a multi-layer electrical core switching hierarchy. As server bandwidth grows from 10 Gbps to 40 Gbps and beyond, it becomes increasingly difficult to provide adequate electrical switching capability to support all possible server-to-server communication patterns at full bandwidth across a large data center. Therefore, what is still needed in the art are improved systems and methods for the large scale interconnection of electrical switches such as the TORs and the like. Note, other architectures besides TORs/EORs are also used such as middle of rows (MORs)/EORs without TORs, hierarchies without EORs, etc. Each of these architectures also needs improved systems and methods for the large scale interconnection of electrical switches.

A similar interconnect scaling problem exists in multi-chassis routers and electrical switches. That is, data center applications are an exemplary embodiment and generally this interconnect scaling problem can exist with any generalized multi-chassis routers and electrical switches. As network capacity increases, there is a need for increased scaling of non-blocking electrical switches. Switching chassis scale is set by the density of optical interfaces. However, projected network junction bandwidth is anticipated to require multi-chassis switching solutions to reach the required scale, and, in such systems, the multi-chassis interconnects present significant challenges in terms of size, cost, and power dissipation.

Referring to FIG. 1, a typical problem observed in a large data center is illustrated in the following example of a "fat tree" architecture. Servers 5 are interconnected to an electrical TOR switch 10 via D server links 11. These server rack-level links 11 are typically electrical. There is a minimum of one link 11 per server 5, but there could be more than one. These links 11 are typically 1 Gigabit Ethernet (GE) today, but, in the near future, they will be 10 GE and 40 GE. The TOR switches 10 are connected to the core switches 12 (currently electrical) or routers, which provide overall data center interconnect. These links 13 are typically optical (usually at 10 Gbps, but increasing over time) and the number of TOR uplinks, U, is the same as the number of core switches 12 in a minimally-connected two-level tree. It should be noted that there may be multiple uplinks from each TOR switch 10 to the core switches 12 in order to better match the total interface bandwidth on the servers 5. For purposes here, the total number of these uplinks is U. The core port count, C, determines the maximum number of TOR switches 10 that may be interconnected. Additional ports on the core switch 12 must be reserved to bring data into and out of the server cluster, but for purposes here these are ignored.

Thus, the total number of server ports that may be interconnected across a two-level tree is $C*D$ (if D is constant across all TOR-core connections, which is a reasonable simplification). Common practice can achieve full bandwidth interconnection only among a group of the order of 1000 servers in a two level fat tree, while the largest data centers have more than 100,000 servers. Additional layers (typically aggregation switches) may be added if increased capacity is required, but at a substantial increase in overall complexity, cost, and power consumption.

Thus, the scale of modern data centers is such that managing TOR-to-core uplinks becomes very difficult. The sheer number of required interconnect cables leads to management and cost problems. The optical cables become a jumbled mess. Clearly, a more scalable approach is desirable to address both the cabling and core switch count and capacity constraints.

BRIEF SUMMARY OF THE DISCLOSURE

In one exemplary embodiment, the present disclosure provides an optical switch fabric including a first set of horizontal optical waveguides coupled to a plurality of external switches and receiving a plurality of wavelengths from the plurality of external switches; a plurality of wavelength-selective drop optical switches associated with the first set of horizontal optical waveguides, wherein the plurality of wavelength-selective drop optical switches are each configured to drop a selected wavelength from a horizontal optical waveguide of the first set of horizontal optical waveguides to an associated vertical optical waveguide of a plurality of vertical optical waveguides; and a plurality of controllable optical switches associated with the plurality of vertical optical waveguides, wherein the plurality of controllable optical switches are each configured to direct a selected wavelength from a vertical optical waveguide of the plurality of vertical optical waveguides to a horizontal optical waveguide of a second set of horizontal optical waveguides, and wherein the second set of horizontal optical waveguides are coupled to a plurality of external switches and send a plurality of wavelengths to the plurality of external switches. One or more of the plurality of wavelength-selective drop optical switches and the plurality of controllable optical switches can be dynamically reconfigurable. The optical switch fabric can be rearrangeably non-blocking via a centralized controller coupled to the optical switch fabric. The plurality of external switches can include electrical switches, and the plurality of external switches can include electrical switches in a data center. The optical switch fabric can be constructed on a Silicon photonics platform. The plurality of horizontal optical waveguides and the plurality of vertical optical waveguides can be coupled by a plurality of Silicon ring resonators including the plurality of wavelength-selective drop optical switches.

In another exemplary embodiment, the present disclosure provides an optical switch fabric including a centralized optical cross-connect switch including a dual cross-linked matrix of controllable switching elements; and a plurality of edge switches, wherein each of the plurality of edge switches includes a multi-wavelength transceiver coupled to the centralized optical cross-connect switch; wherein the plurality of edge switches are each communicatively coupled directly therebetween and communicatively coupled therebetween via the optical cross-connect switch. An optical switch state of the centralized optical cross-connect switch can be coordinated with edge wavelength assignment of the multi-wavelength transceiver at each of the plurality of edge switches. The edge wavelength assignment can include one of a fixed wavelength assignment for each of the multi-wavelength transceivers and a dynamic wavelength assignment for each of the multi-wavelength transceivers. The dual cross-linked matrix of controllable switching elements can include a first set of horizontal optical waveguides receiving a plurality of wavelengths; a plurality of wavelength-selective drop optical switches associated with the first set of horizontal optical waveguides, wherein the plurality of wavelength-selective drop optical switches are each configured to drop a selected wavelength or group of wavelengths from a horizontal optical waveguide of the first set of horizontal optical waveguides to an associated vertical optical waveguide of a plurality of vertical optical waveguides; and a plurality of controllable optical switches associated with the plurality of vertical optical waveguides, wherein the plurality of controllable optical switches are each configured to direct a selected wavelength or group of wavelengths from a vertical optical waveguide of the plurality of vertical optical waveguides to a horizontal optical waveguide of a second set of horizontal optical waveguides, and wherein the second set of horizontal optical waveguides output a plurality of wavelengths.

In yet another exemplary embodiment, the present disclosure provides a data center network including a local-area network that includes a centralized optical cross-connect switch including a dual cross-linked matrix of controllable switching elements; and one or more edge switches coupled to the centralized optical cross-connect switch; and a wide-area network coupling the data center of the local-area network to other integrated data centers. An optical switch state of the centralized optical cross-connect switch can be coordinated with edge wavelength assignment of the one or more edge switches. The dual cross-linked matrix of controllable switching elements can include a first set of horizontal optical waveguides receiving a plurality of wavelengths; a plurality of wavelength-selective drop optical switches associated with the first set of horizontal optical waveguides, wherein the plurality of wavelength-selective drop optical switches are each configured to drop a selected wavelength or group of wavelengths from a horizontal optical waveguide of the first set of horizontal optical waveguides to an associated vertical optical waveguide of a plurality of vertical optical waveguides; and a plurality of controllable optical switches associated with the plurality of vertical optical waveguides, wherein the plurality of controllable optical switches are each configured to direct a selected wavelength or group of wavelengths from a vertical optical waveguide of the plurality of vertical optical waveguides to a horizontal optical waveguide of a second set of horizontal optical waveguides, and wherein the second set of horizontal optical waveguides output a plurality of wavelengths.

In still yet another exemplary embodiment, the present disclosure includes an optical system with a centralized optical cross-connect switch; one or more edge switches coupled to the centralized optical cross-connect switch; and a controller coupled to the centralized optical cross-connect switch, wherein the controller is operable for coordinating an optical switch state of the centralized optical cross-connect switch with edge wavelength assignments of the one or more edge switches, and wherein the controller is operable for dynamically reconfiguring the centralized optical cross-connect switch such that the centralized optical cross-connect switch is rearrangeably non-blocking. The centralized optical cross-connect switch can include a dual cross-linked matrix of controllable optical switches. The one or more edge switches can be disposed in a data center.

BRIEF DESCRIPTION OF THE DRAWINGS

Exemplary and non-limiting embodiments of the present disclosure are illustrated and described herein with reference to the various drawings, in which like reference numbers are used to denote like system components and/or method steps, as appropriate, and in which:

FIG. 1 is a schematic diagram illustrating a conventional switching architecture utilized in a data center or the like;

FIG. 3 is a schematic diagram illustrating a conventional switching architecture utilized in a data center or the like;

DETAILED DESCRIPTION OF THE DISCLOSURE

Figure 1:
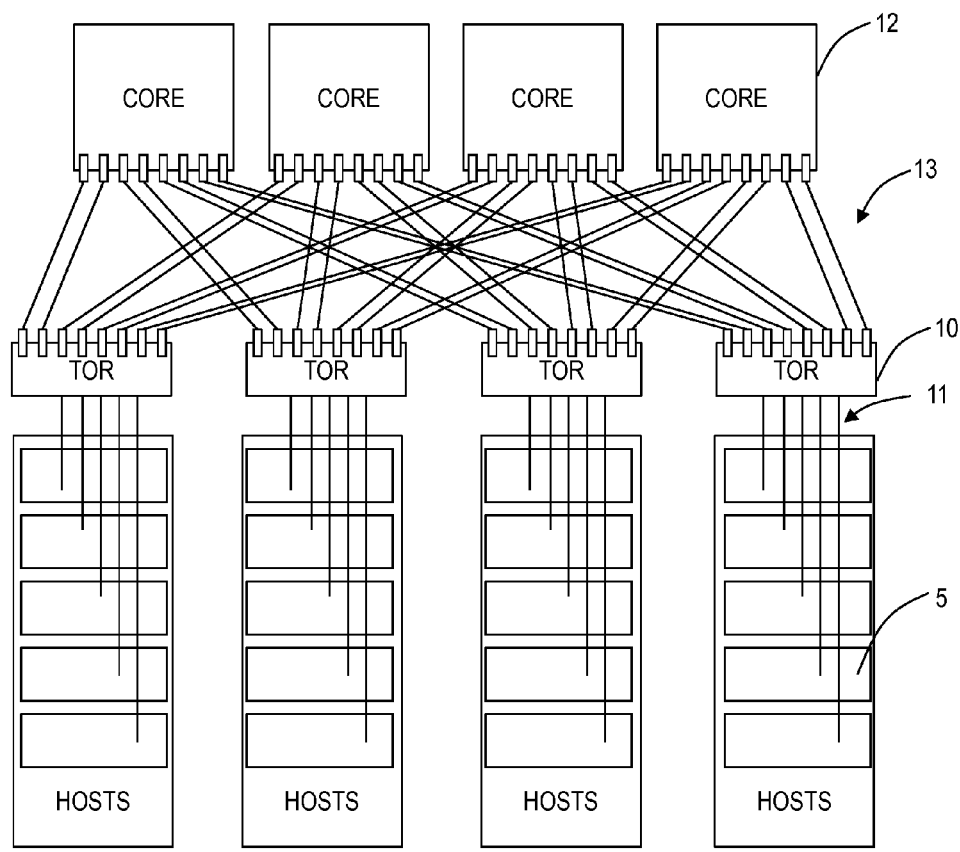
Figure 2:
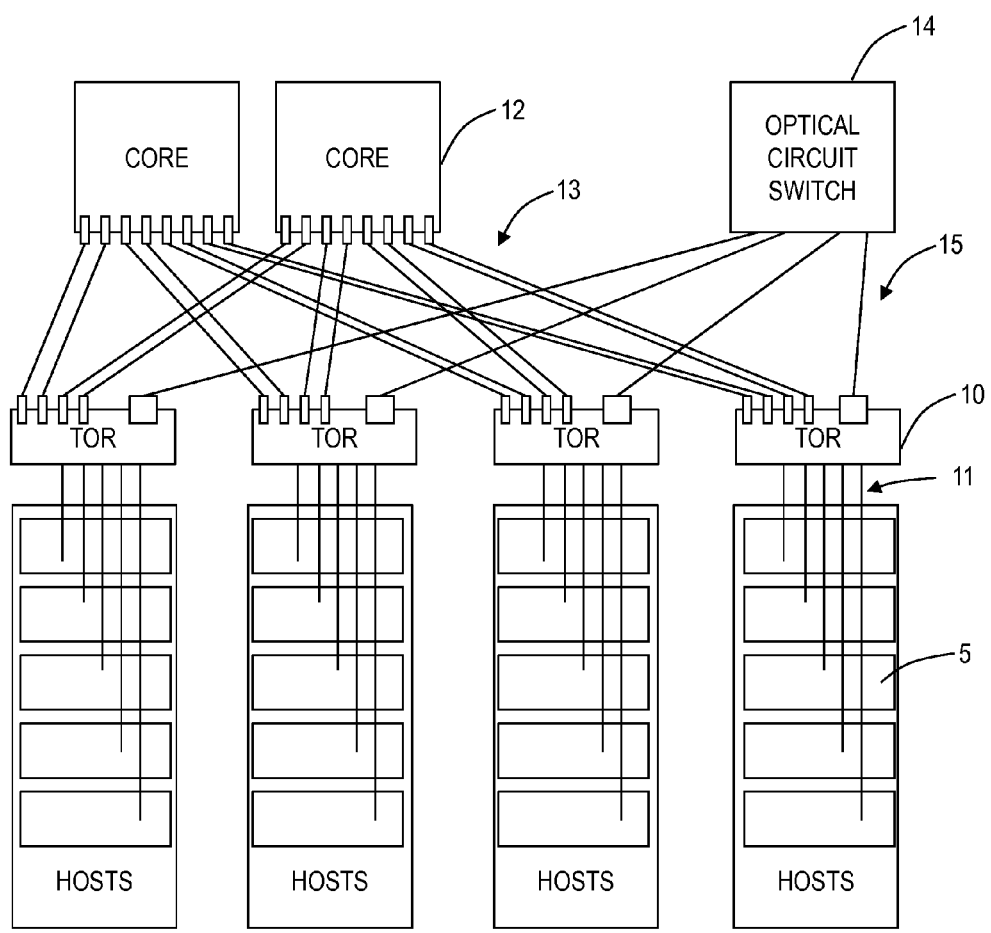
FIG. 2 is a schematic diagram illustrating a switching architecture utilized in a data center or the like in accordance with one exemplary embodiment of the present disclosure.

An approach that has met with excellent success in wide-area networking is wavelength division multiplexing (WDM), whereby multiple uplinks are carried on a set of diverse wavelengths that share a single cable. This approach works particularly well when coupled with a centralized optical switch fabric. This is illustrated in FIG. 2, utilizing an optical switch 14 with optical links 15 to/from the TOR switches 10. In comparison with an electrical solution to interconnect TOR switches 10, cabling complexity is reduced, as well as the cost and power consumption associated with the larger number of core switches 12 that would be required. This architecture, in accordance with the systems and methods of the present disclosure, utilizes a hybrid electrical-optical switch fabric with support for a large number of wavelengths (at least 40, preferably 128 or more), support for a large number of server rack interconnects (at least 40, preferably 128 or more), fast reconfiguration, low cost, and low power consumption. Advantage is taken of the following facts: 1) data centers are much smaller and better controlled than wide-area networks, and tight coordination may be established between the central optical switch fabric and the edge electrical switches; 2) it is sufficient to have the electrical-optical switch fabric rearrangeably non-blocking—it does not have to be non-blocking in the strict sense; 3) coordination between a centralized optical switch fabric and edge electrical switching and wavelength assignment provides rearrangeably non-blocking switching with single-wavelength granularity; and 4) wavelength assignment does not have to be symmetric, i.e. a TOR 1 to TOR 2 connection may have different wavelengths from a reverse TOR 2 to TOR 1 connection. The centralized optical switch fabric is constructed on a low-cost, low-power consumption silicon photonics platform or the like. The centralized optical switch fabric utilizes tight control coordination with the wavelength assignment function from the WDM transceivers placed at the edge TOR switches 10.

The systems and methods of the present disclosure provide substantial benefits, including: 1) optical switch complexity and size associated with current state-of-art large arrayed waveguide grating (AWG) wavelength demultiplexing components, micro-electromechanical systems (MEMs)-based optical switch, and wavelength selective switch (WSS) modules are eliminated; 2) all of the complex optics are replaced with a complementary metal oxide semiconductor (CMOS) integrated die or the like to provide full wavelength demultiplexing, switching, and remultiplexing functionality within a small die footprint; 3) there is a large reduction in optical switch control complexity and associated optical switch control power consumption; and 4) rearrangeably non-blocking functionality for data center, high-performance computing or the like network applications, with single-wavelength granularity, is provided. In particular, the systems and methods described herein are adding a parallel switching mechanism that can be automatically configured to allow a larger number of server racks to be interconnected optically.

In a conventional optical demultiplexing, switching, and optical multiplexing architecture, optical signals come in wavelength multiplexed on a single fiber from each server rack, with L wavelengths per fiber. There are C fibers, at least one per server rack. At the optical switch, the wavelengths are demultiplexed by an AWG or the like with L output ports, such that each port is mapped to a single fixed wavelength. An optical switch with CxC ports establishes an arbitrary cross-connection to the output wavelengths, which are subsequently wavelength multiplexed to a single output fiber per destination server rack. L and C are positive integers.

This architecture requires C demultiplexes, C multiplexes, and L optical space switches with CxC ports. Therefore, this approach is fairly bulky and expensive.

Integrated WSSs improve the economics of building arbitrary optical interconnects. A WSS module typically has a single fiber input from a single server rack, carrying L wavelengths. Internal integration of the demux/mux and switch allows the selection and direction of each wavelength to one of the output ports.

Figure 3:
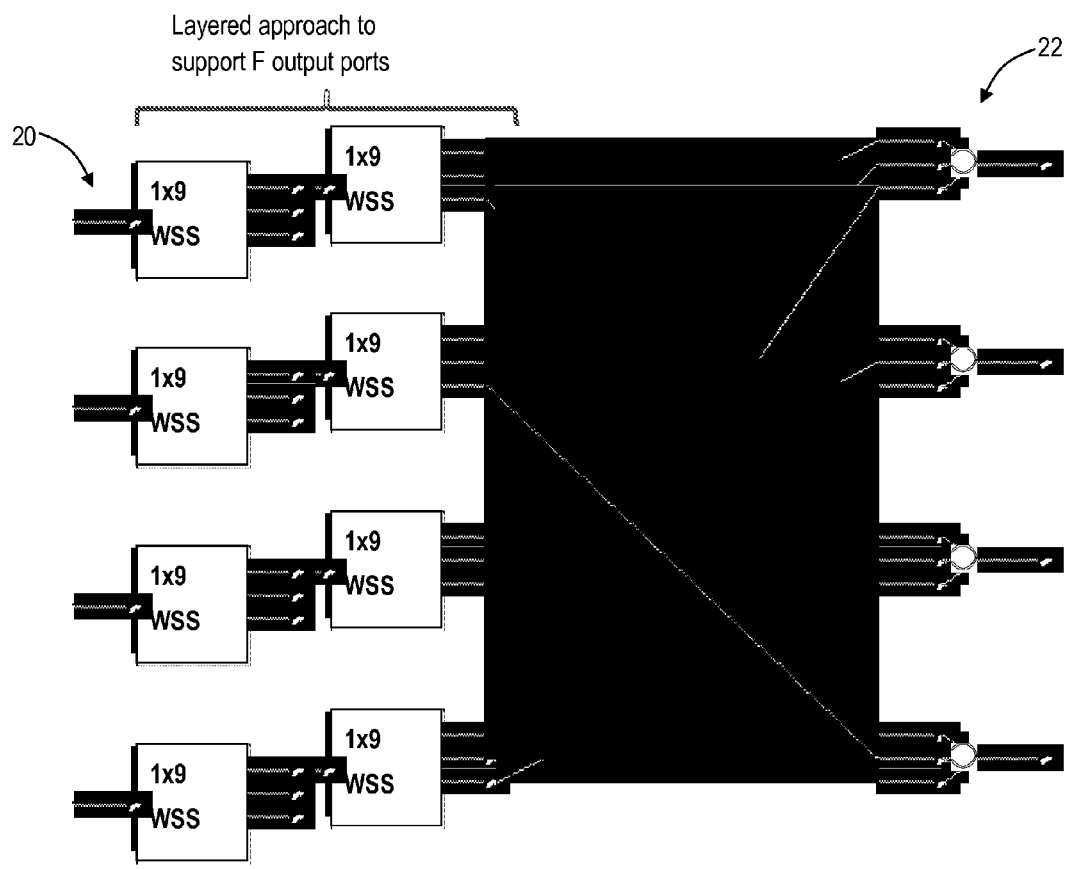

Referring to FIG. 3, in a conventional setup, a single WSS switch 20 per server rack is required on the input, with the output being a wavelength-independent coupler 22. WSS blocks 20 typically have a limited number of output ports, with 9 being typical and 20 being developed, etc. Thus, interconnecting a large number of server racks, C, requires a multi-layer WSS approach, with approximately (C/9)*C+C number of modules. For example, interconnecting 40 server racks requires 200 WSS modules 20 with 1:9 ports, or 80 WSS modules 20 with 1:20 ports. Each WSS block 20 is fairly large and may consume about 10 W of power, and costs several thousand dollars.

Thus, conventional approaches for constructing reconfigurable optical add-drop multiplexer (ROADM)-type optical switches typically target wide-area type networks. These designs are characterized in their ability to interconnect a relatively small number of input degree ports (typically 4, or potentially 8), by their relatively slow reconfiguration speeds (on the order of milliseconds), and by their lack of fast coordination between switch states and transponder wavelength assignment.

As a result of wide-area network (WAN) application constraints, conventional ROADM designs are relatively bulky, expensive, power hungry, and may not be scaled to support the required number of input degrees (i.e. 64 or more). For example, ROADMs are typically designed for 2 to 8 degrees, as is often required by metro, regional, and long haul networks. The applications described herein may require much higher degrees, i.e. 64 or more (i.e. conventional ROADMs are inefficient for such large degree deployments). Some CMOS-based optical switch designs have been proposed, but are limited to a 1:1 interconnect configuration, whereby a single TOR switch may connect to only a single other TOR switch. Some other designs have also been considered, including a semiconductor optical amplifier (SOA)-based switch matrix, with the SOAs serving as on/off switches. A larger switch is constructed using a 3-stage Clos architecture. The switch is fabricated in an Indium Phosphide (InP) platform, and consumes about 16 W for a 16×16 configuration. If applied to a WDM signal, it must be surrounded by wavelength mux/demux structures and considerably expanded in port count, i.e. to at least 160×160.

Another exemplary data center configuration utilizes a passive optical layer with wavelength-dependent mux/demux to establish a static interconnect between server racks. Actual pair-wise interconnection paths may be modified by tuning source wavelength, but overall capacity is fixed by the static passive optical components used for wavelength routing, such as a cyclic AWG. A further exemplary data center configuration utilizes a complex multi-layer scheme, with serial packets converted to a parallel burst in the wavelength domain, using multi-wavelength modulation, time-shifting, and gating. All are followed by a complex space switch configuration.

Thus, the architecture of the present disclosure utilizes a hybrid electrical-optical switch fabric with support for a large number of wavelengths (at least 40, preferably 128 or more), support for a large number of server rack interconnects (at least 40, preferably 128 or more), fast reconfiguration, low cost, and low power consumption.

Figure 4:
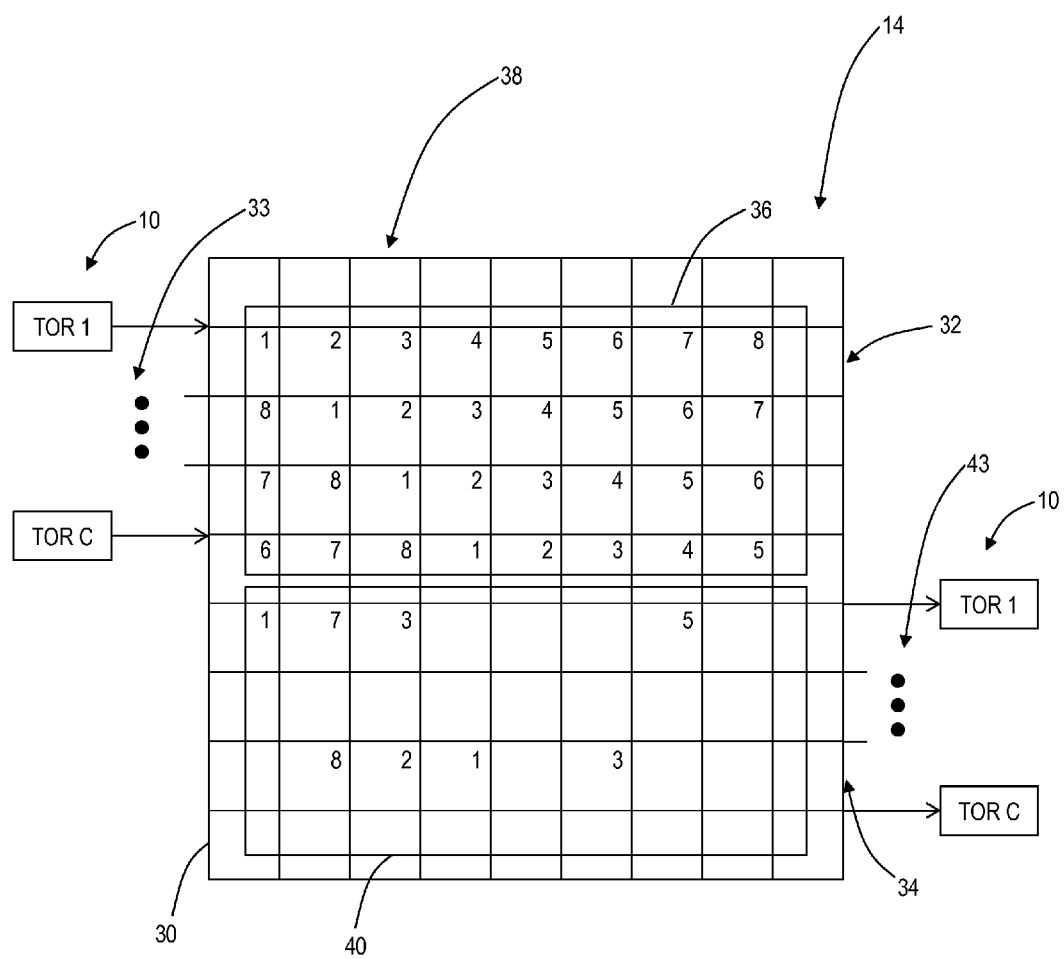
FIG. 4 is a schematic diagram illustrating an optical switch architecture utilized in a data center or the like in accordance with an exemplary embodiment of the present disclosure.

Referring to FIG. 4, in a preferred exemplary embodiment of the present disclosure, the central optical switch fabric 14 is fabricated on a low-cost, low-power consumption Silicon photonics platform or the like. The optical switch fabric 14 includes an optical waveguide grid 30. A first set of horizontal optical waveguides 32 accepts a single optical input 33 from a TOR switch 10 per waveguide, with L wavelengths multiplexed together. Wavelength-selective drop optical switches 36 are positioned at the intersections with vertical waveguides 38, and select a single arbitrary wavelength to be dropped down into a corresponding vertical waveguide 38. Thus, a matrix of controllable switches 36 on the first set of horizontal waveguides 32 serves to simultaneously demux input wavelengths and rearrangeably mux them onto the vertical waveguides 38. A second set of arbitrarily-controllable wavelength-selective switches 40 selects wavelengths from the vertical waveguides 38 and directs them to the desired member of a second set of horizontal optical waveguides 34.

In FIG. 4, numbers illustrated at the waveguide crossings indicate the redirection of a specific wavelength. For example, TOR 1 output 43 connects: 1, 3 from TOR 1 input 33; 5 from TOR 3 input 33; and 7 from TOR C input 33. TOR C output 43 connects: 2 from TOR 2 input 33; 8 from TOR 3 input 33; and 1, 3 from TOR C input 33. It should be noted that, as used herein, "horizontal" and "vertical," "first" and "second," and the like are used only to differentiate waveguides and are not intended to be limiting in terms of physical orientation or position in any manner.

Each block associated with the first set of horizontal optical waveguides 32 has CxL*(int(C/L)+1) crossings, each crossing is a dynamic filter that directs one specific wavelength down, and the whole first set of horizontal optical waveguides 32 serves to both demux TOR wavelengths and mix TOR wavelengths. Each block associated with the second set of horizontal optical waveguides 34 has CxL*(int(C/L)+1) crossings, and each crossing is a dynamic filter that directs one specific wavelength to a destination TOR 10.

Note, FIG. 4 is illustrated with the optical switch fabric 14 interfacing TOR switches 10 for illustration purposes. The optical switch fabric 14 is configured to interface between any type of electrical switch, router, etc.

Figure 5:
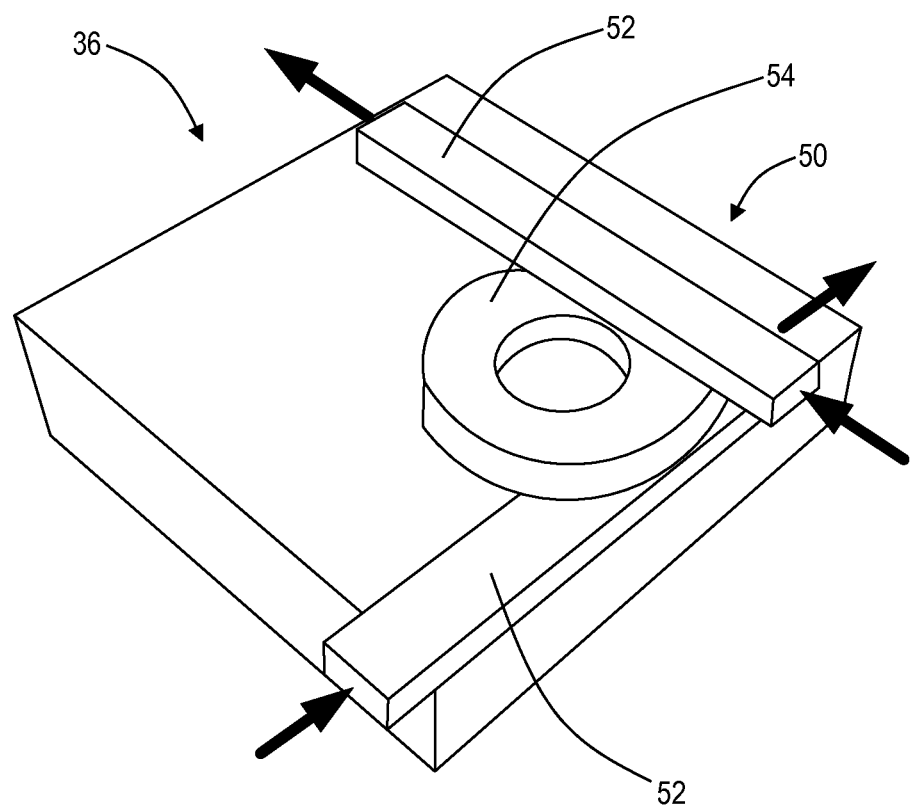
FIG. 5 is a perspective diagram illustrating a wavelength-selective drop optical switch in accordance with a further exemplary embodiment of the present disclosure.

Referring to FIG. 5, in an exemplary embodiment of the present disclosure, each of the wavelength-selective drop optical switches 36 is constructed from a Silicon-based ring resonator structure 50 including Silicon Nitride waveguides 52 (32, 34, and 38) coupled by a polycrystalline Silicon ring 54, with all components formed as deposited layers on a chip.

An estimated calculation of the expected Silicon photonic die size may be performed using the following assumptions:
40 wavelengths from each server rack TOR switch;
64 total server rack TOR switches interconnected, and
50 micron pitch for optical waveguide spacing.
Switch Core Length ~64*50 μm=3.2 mm; and
Switch Core Width ~64*2*50 μm=6.4 mm.
Such dimensions for a Silicon die size are well within current CMOS foundry capabilities. Further, if SiN based waveguides with ~0.2 dB/cm loss are assumed, the total waveguide optical loss is well controlled to under about 0.5 dB. It should be noted that a polarization diversity scheme may be implemented with two optical switch matrices to handle transverse electric (TE) and transverse magnetic (TM) modes.

Assuming that ring resonators 50 are used as the wavelength-selective elements, their size depends on the Free Spectral Range required to accommodate all channels:
$N_{ch}*\Delta f = c/(2*\pi*n_{Si}*R)$;
$N_{ch}=44$ channels;
$\Delta f=100$ GHz channel spacing;
$n_{Si}=3.48$ index of refraction; and
$R=3.1$ μm ring radius.

Signal cross-talk plays a fundamental role in limiting overall circuit size and scalability. Some recent measurements have shown cascaded micro-ring resonator cross-talk level is $X_{dB} \sim -38$ dB.

There are C total combined inputs, each contributing an overlapping wavelength crosstalk component to the output, with total quasi-coherent cross-talk as below. The cross-talk is quasi-coherent since nominally identical wavelengths may still not overlap completely due to laser offsets.

$XT_{coh} = X_{dB} + 10 \log(C) = -38 + 10 \log(64) = -20$ dB

There is additional cross-talk accumulated from wavelengths that are not selected by the output switch. This crosstalk is not coherent to the selected channel, comes from all the input ports with half wavelengths, and experiences isolation corresponding to two wavelength selective switches.

$XT_{incoh} = 2*X_{dB} + 10 \log(C) + 10 \log(L/2) = -2*38 + 10 \log(64) + 10 \log(40/2) = -45$ dB Some example wavelength assignments and optical switch settings (using small visually tractable networks) include the following. In the following illustrations, numbers at the intersection of Column and Row indicate corresponding wavelength switch setting.

Example 1

4 Rack TORs, 3 Waves, Full 1:1 Mesh (Excluding Loopback)

|  | c1 | c2 | c3 | c4 |
|---|---|---|---|---|
| InpRow 1: | 1 | 3 | 2 | 0 |
| InpRow 2: | 0 | 2 | 1 | 3 |
| InpRow 3: | 2 | 0 | 3 | 1 |
| InpRow 4: | 3 | 1 | 0 | 2 |
| OutRow 1: | 2 | 1 | 0 | 3 |
| OutRow 2: | 3 | 0 | 2 | 1 |
| OutRow 3: | 0 | 3 | 1 | 2 |
| OutRow 4: | 1 | 2 | 3 | 0 |

It is interesting to note that above configuration has 3 wavelengths for interconnecting 4 nodes (no loopback), but still requires 4 columns.

Example 2

4 Rack TORs, 4 Waves, Full 1:1 Mesh (Excluding Loopback) with Demands 1-3 and 2-4 at 2 Waves

|  | c1 | c2 | c3 | c4 |
|---|---|---|---|---|
| InpRow 1: | 2 | 3 | 4 | 1 |
| InpRow 2: | 4 | 1 | 3 | 2 |
| InpRow 3: | 3 | 2 | 1 | 4 |
| InpRow 4: | 1 | 4 | 2 | 3 |
| OutRow 1: | 3 | 4 | 1 | 2 |
| OutRow 2: | 1 | 2 | 4 | 3 |
| OutRow 3: | 4 | 3 | 2 | 1 |
| OutRow 4: | 2 | 1 | 3 | 4 |

Example 3

6 Rack TORs, 6 Waves, Full 1:1 Mesh (Excluding Loopback)

|  | c1 | c2 | c3 | c4 | c5 | c6 |
|---|---|---|---|---|---|---|
| InpRow 1: | 1 | 2 | 5 | 4 | 3 | 0 |
| InpRow 2: | 6 | 3 | 1 | 2 | 4 | 0 |
| InpRow 3: | 5 | 1 | 4 | 6 | 0 | 3 |
| InpRow 4: | 3 | 4 | 6 | 5 | 1 | 0 |
| InpRow 5: | 2 | 5 | 3 | 1 | 6 | 0 |
| InpRow 6: | 0 | 6 | 2 | 3 | 5 | 1 |
| OutRow 1: | 6 | 4 | 2 | 1 | 0 | 3 |
| OutRow 2: | 5 | 6 | 3 | 4 | 1 | 0 |
| OutRow 3: | 0 | 5 | 6 | 2 | 3 | 1 |
| OutRow 4: | 2 | 1 | 5 | 3 | 4 | 0 |
| OutRow 5: | 3 | 2 | 1 | 6 | 5 | 0 |
| OutRow 6: | 1 | 3 | 4 | 5 | 6 | 0 |

Thus a matrix of controllable switches on the horizontal waveguides serves to simultaneously demux input wavelengths and rearrangeably mux them onto vertical waveguides, achieving a fully non-blocking interconnect. The specific association of the data flow with a wavelength can be achieved using wavelength tunable transceivers. However, this is generally optically complex and expensive. A preferred method is to provide this association at the electrical layer in the TOR, keeping optical wavelengths fixed. This allows arbitrary cross-connectivity of wavelengths and achieves the goals of:

1. Support for a large number of wavelengths (at least 40, preferably 128 or more);
2. Support for a large number of rack interconnects (at least 40, preferably 128 or more);
3. Low power consumption;
4. Low cost; and
5. Fast reconfiguration.

It should be noted that the specifics, such as sizes and powers, are included as realistic current implementations, but the principles herein are applicable to other specifics that meet the same conceptual radius, including radio implementations and implementations for different wavelengths or in different materials.

Figure 6:
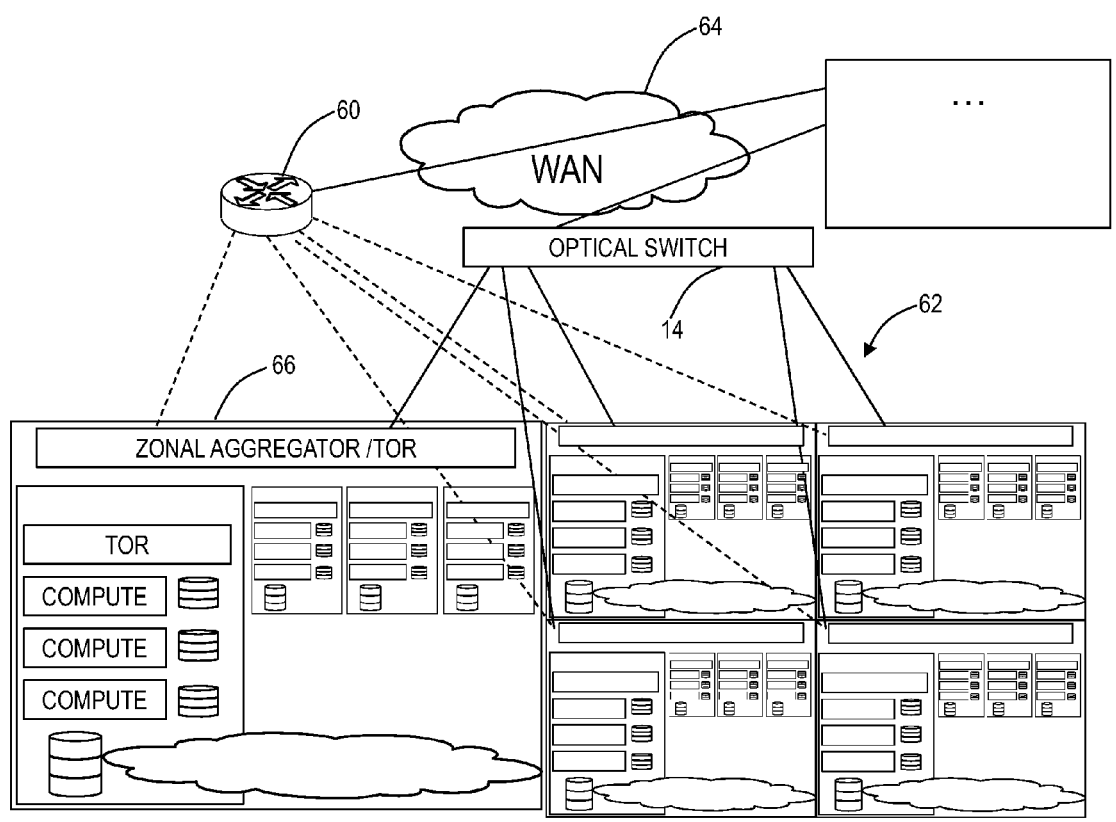
FIG. 6 is a schematic diagram illustrating a data center incorporating the switching architecture of the present disclosure.

FIG. 6 illustrates a typical resulting datacenter architecture. Here, the router 60 (which denotes a combination of Layer 2 switch and a Layer 3 router) is working in parallel with (or "above") the optical switch 14 described above. Thus, with the addition of the optical switch 14 described above, an optimal datacenter architecture is optically focused. This architecture allows a seamless local-area network (LAN) 62 inside the data center/WAN 64 to other data centers which are integrated. As even the largest implementation of this optical switch 14 may not suffice for large data centers, a "zonal aggregator/TOR" switching element 66 is optionally added. This element 66 (which may be in addition to or integrated with a TOR switch) is a local aggregator that allows the size limited central optical switch 14 to access the entire data center. Namely, if a data center has S end elements (e.g. computing elements), the central optical switch 14 has W WAN links, and the central optical switch 14 has O links, the zonal aggregator 66 (if uniformly distributed) has (W-O) "zones." Each zone can have multiple wavelengths, which may be distributed electrically or optically or otherwise or hybrids of these to the (S/(W-O) on average) data center end elements contained in the zone.

Note that data centers are normally interconnected by switches at layer 2. They are also interconnected by routers at layer 3, usually as a layer on top of the layer 2 switches (this is shown simply as a switch router in the diagram, as a simplification). There is also a storage area network (SAN) shown in the diagram, representing the usual SAN found in data centers. Also shown is the storage element embedded with each compute element, as an alternate or supplemental storage methodology. It is noted that the same architecture could be done with respect to the SAN network instead or in addition or at the same time as the layer 2/layer 3 network that is switched optically.

It should be noted that various algorithms may be used to determine optical wavelength switch states and wavelength assignment in order to provide minimal existing connectivity disruption, while rapidly satisfying required demand connectivity reconfiguration. Further, the optical switch fabrics of the present disclosure may be selectively implemented and used for larger data transmissions, with conventional electrical methodologies used for shorter data transmissions. This is also coordinated through the centralized control.

As has been described above, the present disclosure is applicable to data center and other high-performance computing applications. With the increased use of data centers and Tera and Exa Flop computing, this market space is expected to see substantial growth. An additional applicable market is small Access and Metro networks.

Although the present disclosure is illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. An optical switch fabric, comprising:
   a centralized optical cross-connect switch comprising a dual cross-linked matrix of controllable switching elements; and
   a plurality of edge switches, wherein each of the plurality of edge switches comprises a multi-wavelength transceiver coupled to the centralized optical cross-connect switch;
   wherein the plurality of edge switches are each communicatively coupled directly there between and communicatively coupled there between via the optical cross-connect switch.

2. The optical switch fabric of claim 1, wherein an optical switch state of the centralized optical cross-connect switch is coordinated with edge wavelength assignment of the multi-wavelength transceiver at each of the plurality of edge switches.

3. The optical switch fabric of claim 2, wherein the edge wavelength assignment comprises one of a fixed wavelength assignment for each of the multi-wavelength transceivers and a dynamic wavelength assignment for each of the multi-wavelength transceivers.

4. The optical switch fabric of claim 1, wherein the dual cross-linked matrix of controllable switching elements comprises:
   a first set of horizontal optical waveguides receiving a plurality of wavelengths;
   a plurality of wavelength-selective drop optical switches associated with the first set of horizontal optical waveguides, wherein the plurality of wavelength-selective drop optical switches are each configured to drop a selected wavelength or group of wavelengths from a horizontal optical waveguide of the first set of horizontal optical waveguides to an associated vertical optical waveguide of a plurality of vertical optical waveguides; and
   a plurality of controllable optical switches associated with the plurality of vertical optical waveguides, wherein the plurality of controllable optical switches are each configured to direct a selected wavelength or group of wavelengths from a vertical optical waveguide of the plurality of vertical optical waveguides to a horizontal optical waveguide of a second set of horizontal optical waveguides, and wherein the second set of horizontal optical waveguides output a plurality of wavelengths.

5. The optical switch fabric of claim 4, wherein one or more of the plurality of wavelength-selective drop optical switches and the plurality of controllable optical switches are dynamically reconfigurable.

6. The optical switch fabric of claim 4, wherein the optical switch fabric is rearrangeably non-blocking via a centralized controller coupled to the optical switch fabric.

7. The optical switch fabric of claim 4, wherein the plurality of horizontal optical waveguides and the plurality of vertical optical waveguides are coupled by a plurality of ring resonators comprising the plurality of wavelength-selective drop optical switches.

8. A data center network, comprising:
a local-area network, comprising:
a centralized optical cross-connect switch comprising a dual cross-linked matrix of controllable switching elements; and
one or more edge switches coupled to the centralized optical cross-connect switch; and
a wide-area network coupling the data center of the local-area network to other integrated data centers.

9. The data center network of claim 8, wherein an optical switch state of the centralized optical cross-connect switch is coordinated with edge wavelength assignment of the one or more edge switches.

10. The data center network of claim 8, wherein the dual cross-linked matrix of controllable switching elements comprises:
a first set of horizontal optical waveguides receiving a plurality of wavelengths;
a plurality of wavelength-selective drop optical switches associated with the first set of horizontal optical waveguides, wherein the plurality of wavelength-selective drop optical switches are each configured to drop a selected wavelength or group of wavelengths from a horizontal optical waveguide of the first set of horizontal optical waveguides to an associated vertical optical waveguide of a plurality of vertical optical waveguides; and
a plurality of controllable optical switches associated with the plurality of vertical optical waveguides, wherein the plurality of controllable optical switches are each configured to direct a selected wavelength or group of wavelengths from a vertical optical waveguide of the plurality of vertical optical waveguides to a horizontal optical waveguide of a second set of horizontal optical waveguides, and wherein the second set of horizontal optical waveguides output a plurality of wavelengths.

11. The data center network of claim 10, wherein one or more of the plurality of wavelength-selective drop optical switches and the plurality of controllable optical switches are dynamically reconfigurable.

12. The data center network of claim 10, wherein the optical switch fabric is rearrangeably non-blocking via a centralized controller coupled to the optical switch fabric.

13. The data center network of claim 10, wherein the plurality of horizontal optical waveguides and the plurality of vertical optical waveguides are coupled by a plurality of ring resonators comprising the plurality of wavelength-selective drop optical switches.

14. The data center network of claim 8, further comprising a zonal aggregator switching element for electrically and optically distributing wavelengths to data center end elements associated with a plurality of zones.

15. An optical system, comprising:
a controller coupled to a centralized optical cross-connect switch comprising a dual cross-linked matrix of controllable switching elements, wherein the controller is operable for coordinating an optical switch state of the centralized optical cross-connect switch with edge wavelength assignments of one or more edge switches, wherein each of the one or more edge switches comprises a multi-wavelength transceiver coupled to the centralized optical cross-connect switch, and wherein the controller is operable for dynamically reconfiguring the centralized optical cross-connect switch such that the centralized optical cross-connect switch is rearrangeably non-blocking 16. The optical system of claim 15, wherein the optical switch state of the centralized optical cross-connect switch is coordinated with an edge wavelength assignment of the multi-wavelength transceiver at each of the plurality of edge switches.

17. The optical system of claim 16, wherein the edge wavelength assignment comprises one of a fixed wavelength assignment for each of the multi-wavelength transceivers and a dynamic wavelength assignment for each of the multi-wavelength transceivers.

18. The optical system of claim 15, wherein the dual cross-linked matrix of controllable switching elements comprises:
a first set of horizontal optical waveguides receiving a plurality of wavelengths;
a plurality of wavelength-selective drop optical switches associated with the first set of horizontal optical waveguides, wherein the plurality of wavelength-selective drop optical switches are each configured to drop a selected wavelength or group of wavelengths from a horizontal optical waveguide of the first set of horizontal optical waveguides to an associated vertical optical waveguide of a plurality of vertical optical waveguides; and
a plurality of controllable optical switches associated with the plurality of vertical optical waveguides, wherein the plurality of controllable optical switches are each configured to direct a selected wavelength or group of wavelengths from a vertical optical waveguide of the plurality of vertical optical waveguides to a horizontal optical waveguide of a second set of horizontal optical waveguides, and wherein the second set of horizontal optical waveguides output a plurality of wavelengths.

19. The optical system of claim 18, wherein one or more of the plurality of wavelength-selective drop optical switches and the plurality of controllable optical switches are dynamically reconfigurable.

20. The optical system of claim 18, wherein the plurality of horizontal optical waveguides and the plurality of vertical optical waveguides are coupled by a plurality of ring resonators comprising the plurality of wavelength-selective drop optical switches.

* * * * *